Feb. 14, 1961

J. V. JOHNSTON 2,971,384

TOROIDAL GYROSCOPE

Filed April 1, 1960

James V. Johnston
INVENTOR.

BY
ATTORNEYS.

Feb. 14, 1961  J. V. JOHNSTON  2,971,384
TOROIDAL GYROSCOPE
Filed April 1, 1960  2 Sheets-Sheet 2

James V. Johnston
INVENTOR.

BY S. J. Rotondi,
A. T. Dupont,
and
Alvin E. Moore,
ATTORNEYS.

United States Patent Office 2,971,384
Patented Feb. 14, 1961

2,971,384

TOROIDAL GYROSCOPE

James V. Johnston, 821 Giles Drive, Huntsville, Ala.

Filed Apr. 1, 1960, Ser. No. 19,429

7 Claims. (Cl. 74—5.7)

(Granted under Title 35, U.S. Code (1952), sec. 266)

The invention described herein may be manufactured and used by or for the Government for governmental purposes without the payment of any royalty thereon.

This invention relates to a gyroscope having a fluid-supported rotor. More particularly, the invention pertains to a gryoscope which enables the elimination of gimbals and shafts which are commonly used for supporting the rotor.

A gyroscope without gimbals and shafts thus eliminating mechanical bearings, would be of considerable improved accuracy. There is also a need for a gyroscope having a fluid-supported rotor.

In view of these facts, an object of this invention is to provide a gyroscope which has a fluid-supported rotor.

Another object of the invention is to provide a gyroscope which eliminates the need for gimbal supports.

A further object is to provide a gyroscope with a rotor which eliminates the need for bearings and shafts in supporting the rotor.

The foregoing and other objects of this invention will become more fully apparent from the following detailed description of the embodiment of the invention and from the accompanying drawings, in which.

Figure 1:
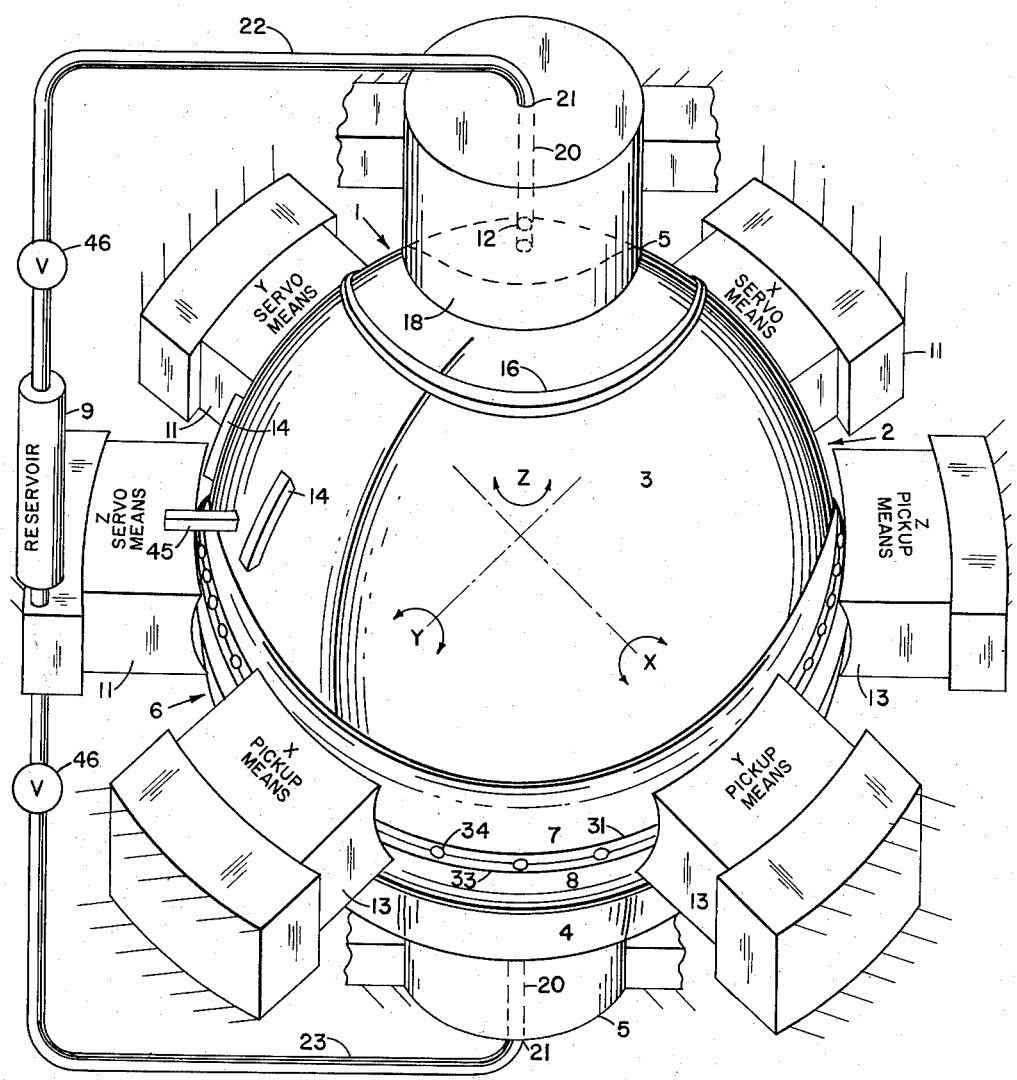
Figure 1 is a perspective view of the gyroscope.
Figure 3:
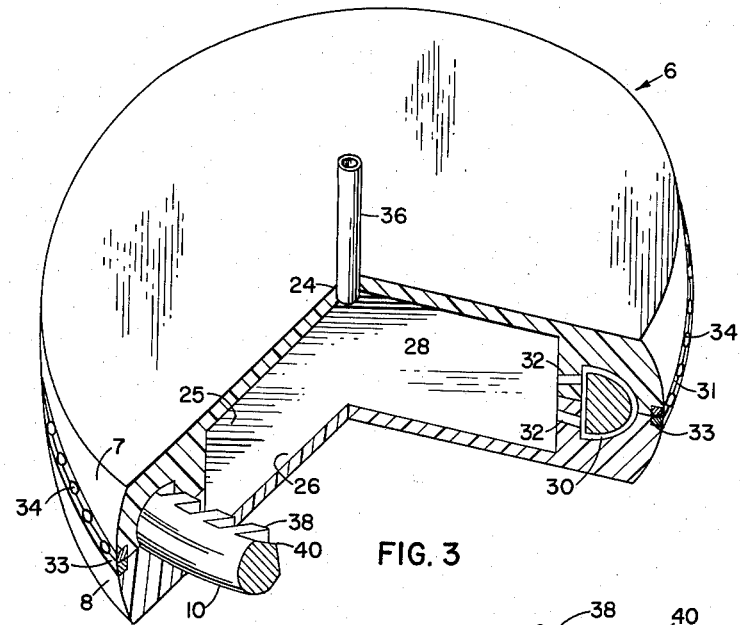
Figure 3 is a detailed perspective view, partly cut away, showing the arrangement of the stator and rotor in Figure 1.
Figure 5:
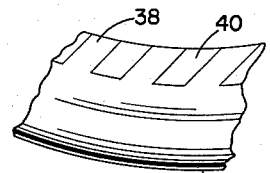
Figure 5 is an inside plan view of part of the rotor.
Figure 2:
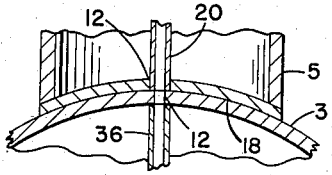
Figure 2 is a detailed view in section from a plane thru the axis of the lower air-supplying tube.
Figure 4:
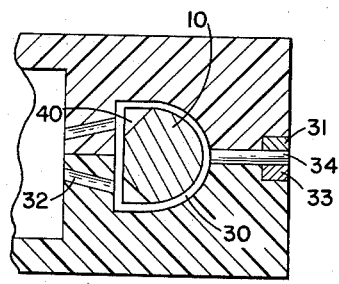
Figure 4 is an enlarged detailed sectional view showing the gyroscopic mass and its turbine drive in cross section.

In the drawings, wherein for the purpose of illustration there is shown a preferred embodiment of the invention, the numeral 1 designates a gyroscope comprising: a spherical body 2, divided into an upper part 3 and a lower part 4; a pair of air bearing supports 5 universally mounting said body; reservoir means 9 for supplying gas under pressure to said bearings and for driving the gyroscope's rotor; an air turbine comprising a stator 6 formed in two portions 7 and 8, and secured between said body parts; a toric gyroscope rotor 10 incorporating the rotor part of said turbine; a plurality of servo means 11, rigid with said air bearing support, spaced around said stator; and a plurality of conventional pickups 13, rigid with said air bearing support, spaced around said stator.

The spherical body 2 preferably is a hollow shell, made in two joined parts 3 and 4. The upper part 3 has a pair of spaced stops 14 adjacent its base and a ring-shaped stop 16 intermediate the pair of spaced stops and the vertex of the body. Stop 16 abuts upper air bearing support 5, so as to limit movement of this support about the X and Y axes.

Each of the air bearing supports has a concave surface 18 that is adapted to receive each end of body 2. Each of these ends has a convex surface which fits the concave surface of one of said supports. Each of the supports is also provided with a longitudinal tube or aperture 20, that extends throughout the length of the support. The ends 21 of tubes 20 are connected as by welding, to conduits 22 and 23. These conduits are connected to reservoir 9, containing compressed air or other gas.

The amount of pressure required to operate the air bearings and the rotor is determined by the pressure required to operate the air bearings plus the amount of additional pressure necessary to operate the rotor. This requirement is determined from the loss of pressure around the air bearings (while in operation) and the amount of pressure exhausted around the rotor (while in operation). Since the air bearings can only exhaust a certain amount of pressure, the rotor is assured of receiving enough pressure for its operation even when the tube 20 and conduits 36 are not in direct alignment.

Portion 7 of said stator has an aperture 24, above air-containing chamber 28, in which lower air-supplying tube 36 is welded or otherwise secured. This tube is flow-connected to upper tube 20, adjacent said air bearing support 5 when the rotor and stator assembly are secured between the two halves of body 2. Chamber 28 comprises two recesses 25 and 26, in parts 7 and 8 of stator 6. Chamber or cavity 28 is flow-connected to annular bore 30 by a plurality of apertures 32 circumferentially spaced around the annular bore. Bore 30 is also flow-connected to the exterior of stator 6 by outlet ports 34. Each of portions 7 and 8 of stator 6 contains a section 31 or 33 of a metal band that is formed in the outer wall of the stator.

Annular bore or annular cavity 30 is adapted to freely enclose rotor 10, so as to allow for passage of air from apertures 32, around the rotor, to outlet ports 34.

Toric rotor 10 has a pluarity of angled turbine vanes 38, on its inner circumference and in flow connection with apertures 32. These vanes are separated by a plurality of angled, cut-out portions 40.

The assembled stator and rotor, secured between the parts of body 2, are encircled by electromagnetic servo means 11 and pickup means 13. One of the servo means also serves as a mount for stop arm 45, which limits movement of the arm about the Z axis by abutting the stops 14.

The operation of the device is as follows:

Compressed air for the air bearings and for providing power to the gyroscope rotor is turned on by means of valves 46. Current is supplied to electromagnets 11, by actuation of a common switch (not shown) creating an attraction on metal pieces 31 and 33. This attraction by the servo means moves the gyroscope to its center position. While this centering movement takes place, the electrical pickup means 13, which are switched on after the servo means, are picking up a changing indication, until the signal is zero. At this point the gyroscope has zero displacement and is centered.

While the gyroscope is being centered, air pressure for operating the rotor passes thru tube 20, opening 12, conduit 36, aperture 24 and into cavity 28. When the pressure reaches this cavity it flows thru apertures 32 into annular bore 30 and cut-out portions 40.

Portions 40 guide the pressurized gas around each side of rotor 10. As the gas passes around the rotor it forms an air-bearing film on all surfaces of the rotor, suspending it within the stator, with a minimum of friction. Gradually the rotor obtains a high rate of speed. When it is thus rotating at high speed, the servo electromagnets 11 are turned off and the body 2 continues to hold its position in space. If the platform or other support, which holds the air bearings, the servo means and the pickup means, is moved, for instance with a vehicle, a signal is supplied from the pickups. This signal indicates the displacement of the platform or other support.

It is to be understood that the form of the invention that is herein shown and described is the preferred embodiment, and that various changes in the shape, size and arrangement of parts may be resorted to without departing from the spirit of the invention or the scope of the subjoined claims.

The following invention is claimed:

1. A gyroscope comprising: a ring-shaped stator having a peripheral, annular hollow space and a central cavity; a body having upper and lower portions, each of which has a spherical surface, said stator being fixed at substantially the center of said body, between said portions; a gyroscopic, ring-shaped rotor loosely housed within said peripheral annular hollow space; an upper and lower gaseous bearing means comprising a bearing support for universally mounting said body, each of said gaseous bearing means supporting one of said spherical surfaces on a gaseous film; means for supplying a source of pressurized gas to said bearing means; electromagnetic means rigid with said bearing support for placing said body in a position of zero displacement; pickup means rigid with said bearing support for indicating when said bearing support deviates in any direction; and means for simultaneously rotating said rotor and sustaining said rotor in a centered position, free of solid friction, within said annular hollow space.

2. A device as set forth in claim 1, in which said means for rotating and sustaining said rotor comprises: spaced gas turbine blades on said rotor; and means for supplying pressurized gas to said blades, for driving said rotor, and around said rotor to exhaust, for centering the rotor.

3. A device as set forth in claim 2, in which said ring-shaped stator further comprises an upper and lower section, a central cavity, a plurality of inlet apertures flow-connecting said central cavity and said annular hollow space, a pair of metal bands centrally positioned around the circumference of said stator, and formed integral with said sections, and a plurality of outlet ports flow-connecting said annular hollow space to the outside of said stator.

4. A device as set forth in claim 2, in which said means for supplying a source of pressurized gas to said bearing means comprises a pressurized gas reservoir, a pair of conduits flow-connecting said reservoir to said gaseous bearing means, and a pair of valves connected intermediate each side of said reservoir and said gaseous bearing means.

5. A device as set forth in claim 2, in which said spaced gas turbine blades are positioned at an angle to said rotor and are separated by a cut-out portion.

6. A device as set forth in claim 2, in which said means for supplying pressurized gas to said blades comprises a conduit flow-connecting said upper gaseous bearing means to said central cavity and a plurality of apertures, circumferentially spaced around said stator, flow-connecting said central cavity and said annular hollow space.

7. A gyroscope comprising: a rotor, said rotor being ring-shaped; a stator provided with an annular hollow space adapted to loosely enclose said rotor; a spherical body having upper and lower portions, said stator being fixed to said body between said upper and lower portions; a pair of spaced movement limiters secured to said upper body portion; a ring-shaped movement limiter secured to said upper body portion above said pair of spaced movement limiters; an upper and lower gaseous bearing means comprising a bearing support for universally mounting said body, said upper gaseous bearing means being adapted to limit movement of said support about its X and Y axes; a gaseous pressure reservoir flow-connected to said upper and lower gaseous bearing means; a plurality of electromagnetic servo means, rigid with said bearing support, for centering said body in a position of zero displacement; a plurality of pickup means, rigid with said bearing support, for indicating a signal when said bearing support deviates, in any direction, and means for coacting with said pair of movement limiters for limiting movement of said bearing support about its Z axis.

References Cited in the file of this patent

UNITED STATES PATENTS

| | | |
|---|---|---|
| 1,864,801 | Chaplin | June 28, 1932 |
| 2,821,859 | Crockett | Feb. 4, 1958 |
| 2,871,703 | Walker | Feb. 3, 1959 |
| 2,915,902 | Brugger | Dec. 8, 1959 |